United States Patent
Sharma et al.

(10) Patent No.: US 11,468,535 B2
(45) Date of Patent: Oct. 11, 2022

(54) METHOD AND SYSTEM FOR REAL-TIME, DYNAMIC AND ADAPTIVE ARTIFICIAL-INTELLIGENCE BASED COST NEGOTIATION FOR TRANSPORTATION SERVICES

(71) Applicant: Camions Logistics Solutions Private Limited, New Delhi (IN)

(72) Inventors: Sumit Sharma, North West Delhi (IN); Parag Aggarwal, North East Delhi (IN); Naitik Baghla, Faridkot (IN)

(73) Assignee: Camions Logistics Solutions Private Limited, New Delhi (IN)

( * ) Notice: Subject to any disclaimer, the term of this patent is extended or adjusted under 35 U.S.C. 154(b) by 399 days.

(21) Appl. No.: 16/810,766

(22) Filed: Mar. 5, 2020

(65) Prior Publication Data
US 2021/0090198 A1   Mar. 25, 2021

(51) Int. Cl.
*G06Q 50/30* (2012.01)
*G06F 16/25* (2019.01)
(Continued)

(52) U.S. Cl.
CPC .......... *G06Q 50/30* (2013.01); *G06F 16/252* (2019.01); *G06N 5/04* (2013.01); *G06N 20/00* (2019.01);
(Continued)

(58) Field of Classification Search
CPC .. G06Q 50/30; G06Q 20/085; G06Q 30/0201; G06Q 30/0611; G06Q 50/188;
(Continued)

(56) References Cited

U.S. PATENT DOCUMENTS

| | | | | |
|---|---|---|---|---|
| 6,064,981 A * | 5/2000 | Barni | ................... | G06Q 50/188 705/401 |
| 6,553,347 B1 * | 4/2003 | Tavor | ..................... | G06Q 30/08 707/999.005 |

(Continued)

FOREIGN PATENT DOCUMENTS

WO   WO-2019170624 A1 *   9/2019   ......... H04L 41/5019

OTHER PUBLICATIONS

"Dynamic Dispatching and Transport Optimization—Real-World Experience with Perspectives on Pervasive Technology Integration," 2009 42nd Hawaii International Conference on System Sciences, 2009, pp. 1-9, doi: 10.1109/HICSS.2009.168. (Year: 2009).*
(Continued)

*Primary Examiner* — Ashford S Hayles
(74) *Attorney, Agent, or Firm* — Kolisch Hartwell, P.C.

(57) ABSTRACT

The present disclosure provides a method, non-transitory computer-readable storage medium, and a vehicle tracking system for real-time, dynamic and adaptive an artificial-intelligence based cost negotiation for transportation services. The system trains the artificial-intelligence based system to negotiate with one or more users for transportation services. In addition, the system obtains a first set of data from the one or more users. Further, the system prepares a first cost quotation for one or more transport vehicles. Furthermore, the system sends the first cost quotation to the one or more users. Moreover, the system receives a response from the one or more users for negotiating on cost. Also, the system analyses the response from the one or more users. Also, the system continuously interacts with the one or more users for the cost negotiation. Also, the system sends a final cost quotation to the one or more users.

20 Claims, 5 Drawing Sheets

(51) Int. Cl.
*G06Q 20/08* (2012.01)
*G06Q 30/06* (2012.01)
*G06Q 30/02* (2012.01)
*G06N 20/00* (2019.01)
*G06N 5/04* (2006.01)
*G06Q 50/18* (2012.01)

(52) U.S. Cl.
CPC ....... *G06Q 20/085* (2013.01); *G06Q 30/0201* (2013.01); *G06Q 30/0611* (2013.01); *G06Q 50/188* (2013.01); *G06Q 2240/00* (2013.01)

(58) Field of Classification Search
CPC .... G06Q 2240/00; G06F 16/252; G06N 5/04; G06N 20/00
See application file for complete search history.

(56) References Cited

U.S. PATENT DOCUMENTS

| | | | | |
|---|---|---|---|---|
| 2002/0178103 | A1* | 11/2002 | Dan | G06Q 50/188 705/37 |
| 2002/0178127 | A1* | 11/2002 | Byde | G06Q 30/0601 705/80 |
| 2003/0014325 | A1* | 1/2003 | Biffar | G06Q 30/08 705/80 |
| 2008/0215493 | A1* | 9/2008 | Ong | G06Q 50/188 705/80 |
| 2016/0104111 | A1* | 4/2016 | Jones | G06Q 30/0611 705/26.4 |
| 2017/0287038 | A1* | 10/2017 | Krasadakis | G06Q 30/0201 |
| 2017/0344932 | A1* | 11/2017 | Ahmadi | G06Q 10/083 |
| 2018/0068269 | A1* | 3/2018 | Pillai | G06Q 10/08345 |
| 2018/0260876 | A1* | 9/2018 | Graham | G06Q 30/0631 |
| 2018/0300647 | A1* | 10/2018 | Blue | H04L 67/10 |
| 2018/0349849 | A1* | 12/2018 | Jones | G06Q 10/08345 |
| 2019/0180234 | A1* | 6/2019 | Healy | G06N 3/08 |
| 2019/0325546 | A1* | 10/2019 | Hagestad | G06Q 10/06315 |

OTHER PUBLICATIONS

T. C. Du and H.-L. Chen, "Building a Multiple-Criteria Negotiation Support System," in IEEE Transactions on Knowledge and Data Engineering, vol. 19, No. 6, pp. 804-817, Jun. 2007, doi: 10.1109/TKDE.2007.1018. (Year: 2007).*

* cited by examiner

METHOD AND SYSTEM FOR REAL-TIME, DYNAMIC AND ADAPTIVE ARTIFICIAL-INTELLIGENCE BASED COST NEGOTIATION FOR TRANSPORTATION SERVICES

TECHNICAL FIELD

The present disclosure relates to the field of artificial intelligence, and in particular, relates to a method and system for enabling real time, dynamic and adaptive artificial intelligence based cost negotiation for cost of transportation services.

INTRODUCTION

With the advent in technological advancements over the past few decades, there has been an exponential rise in the logistics industry. Efficient transportation systems are highly valuable for security, lowering expenses, cost negotiation and maintenance. Numerous methods and devices have been developed for automated negotiation with a user based on artificial-intelligence for cost of transportation services. The transportation services may include transportation of goods from one place to another place, loading and unloading of goods from transportation vehicles, leasing of the transportation vehicles, and the like. Further, erroneous automated negotiation with the user for the cost of the transportation services may affect the profitability and transportation cost severely. Furthermore, the automated negotiation with the user for the cost of transportation services is essential for cost optimization and improved user management.

SUMMARY

In a first example, a computer-implemented method is provided. The computer-implemented method is configured to enable real-time, dynamic and adaptive an artificial-intelligence based cost negotiation for transportation services. The computer-implemented method includes a first step to train the artificial-intelligence based system based on a first set of training data to continuously learn to negotiate with one or more users for the transportation services in real-time. In addition, the computer-implemented method includes a second step for setting consulting perimeter for a cost negotiation model. Further, the computer-implemented method includes a third step to obtain a first set of data from the one or more users requesting for one or more transport vehicles. Furthermore, the computer-implemented method includes a fourth step to prepare a first cost quotation for the one or more transport vehicles based on analysis of the first set of data and current set of data. Moreover, the computer-implemented method includes a fifth step to send the first cost quotation for the one or more transport vehicles to the one or more users. Also, the computer-implemented method includes a sixth step to receive a response from the one or more users negotiating cost of the first cost quotation for the one or more transport vehicles. In addition, the response from the one or more users is received in real-time. Also, the computer-implemented method includes a seventh step to analyse the response from the one or more users negotiating cost of the first cost quotation for the one or more transport vehicles based on the first set of data and the current set of data. Also, the computer-implemented method includes an eighth step to continuously interacting with the one or more users according to the cost negotiation model for the cost negotiation in real-time. Also, the method includes a ninth step to send a final cost quotation for the one or more transport vehicles to the one or more users in real-time based on continuous interaction with the one or more users. In addition, the training of the artificial-intelligence based system is done to generate the cost negotiation model. Further, the first set of training data is associated with past interactions with the one or more users and the one or more transport vehicles for a plurality of sources and a plurality of destinations. The first set of training data is received from one or more databases. Furthermore, the consulting perimeter for the cost negotiation model is based on threshold limit of negotiation, maximum profit margin, minimum profit margin, number of time to negotiate with the one or more users. Moreover, the first set of data is received from the one or more users with the facilitation of a plurality of communication devices in real-time. Also, the first set of data of the one or more users and current set of data of the one or more users and the one or more vendors is analysed with the facilitation of the cost negotiation model in real-time. Also, the first cost quotation for the one or more transport vehicles is received by the one or more users with the facilitation of the plurality of communication devices in real-time. Also, the final cost quotation for the one or more transport vehicles is received by the one or more users with the facilitation of the plurality of communication devices in real-time.

In an embodiment of the present disclosure, the first set of training data includes past multiple routes pricing, past seasonality-based pricing, past negotiation behaviour of the user, past negotiation pattern and past required transport vehicle size.

In an embodiment of the present disclosure, the first set of data includes location of source point, time to pick up goods from the source point, location of destination point, time to reach the destination point, overall mass of goods and overall volume of goods.

In an embodiment of the present disclosure, the current set of data includes multiple routes pricing, current season, current fuel prices, current laws for transportation, current route health, current range of vehicle, current route, current schedule of the one or more vendors and future availability of the one or more transport vehicles on request date. In addition, the current set of data includes current location of the one or more transport vehicles, current estimated time of arrival, current load carrying capacity of vehicle, type of vehicle, length of vehicle, engine capacity of vehicle and vendor score.

In an embodiment of the present disclosure, the first cost quotation includes vehicle details, overall transportation cost, terms of transportation and conditions of transportation.

In an embodiment of the present disclosure, the one or more transport vehicles includes single-axle truck, double-axle truck, tri-axle truck, quad-axle truck, bus, train, aircraft, two-wheeler, three-wheeler, trailer truck, transporter truck and mini-truck.

In an embodiment of the present disclosure, the one or more databases includes private databases, third-party databases, paid databases, free databases, training databases and government databases.

In an embodiment of the present disclosure, the one or more users agree on the first cost quotation. In addition, the cost negotiation system facilitates the transportation services to the one or more users.

In an embodiment of the present disclosure, the one or more users request for negotiating on the first cost quotation.

In addition, the cost negotiation system facilitates the transportation services to the one or more users after negotiation.

In a second example, a computer system is provided. The computer system includes one or more processors, and a memory. The memory is coupled to the one or more processors. The memory stores instructions. The memory is executed by the one or more processors. The execution of the memory causes the one or more processors to perform a method to enable real-time, dynamic and adaptive an artificial-intelligence based cost negotiation for transportation services. The method includes a first step to train the artificial-intelligence based system based on a first set of training data to continuously learn to negotiate with one or more users for the transportation services in real-time. In addition, the method includes a second step for setting consulting perimeter for a cost negotiation model. Further, the method includes a third step to obtain a first set of data from the one or more users requesting for a one or more transport vehicles. Furthermore, the method includes a fourth step to prepare a first cost quotation for the one or more transport vehicles based on analysis of the first set of data and current set of data. Moreover, the method includes a fifth step to send the first cost quotation for the one or more transport vehicles to the one or more users. Also, the method includes a sixth step to receive a response from the one or more users negotiating cost of the first cost quotation for the one or more transport vehicles. In addition, the response from the one or more users is received in real-time. Also, the method includes a seventh step to analyse the response from the one or more users negotiating cost of the first cost quotation for the one or more transport vehicles based on the first set of data and the current set of data. Also, the method includes an eighth step to continuously interacting with the one or more users according to the cost negotiation model for the cost negotiation in real-time. Also, the method includes a ninth step to send a final cost quotation for the one or more transport vehicles to the one or more users in real-time based on continuous interaction with the one or more users. In addition, the training of the artificial-intelligence based system is done to generate the cost negotiation model. Further, the first set of training data is associated with past interactions with the one or more users and the one or more transport vehicles for a plurality of sources and a plurality of destinations. The first set of training data is received from one or more databases. Furthermore, the consulting perimeter for the cost negotiation model is based on threshold limit of negotiation, maximum profit margin, minimum profit margin, number of time to negotiate with the one or more users. Moreover, the first set of data is received from the one or more users with the facilitation of a plurality of communication devices in real-time. Also, the first set of data of the one or more users and current set of data of the one or more users and the one or more vendors is analysed with the facilitation of the cost negotiation model in real-time. Also, the first cost quotation for the one or more transport vehicles is received by the one or more users with the facilitation of the plurality of communication devices in real-time. Also, the final cost quotation for the one or more transport vehicles is received by the one or more users with the facilitation of the plurality of communication devices in real-time.

In a third example, a non-transitory computer-readable storage medium is provided. The non-transitory computer-readable storage medium encodes computer executable instructions that, when executed by at least one processor, performs a method. The method is configured to enable real-time, dynamic and adaptive an artificial-intelligence based cost negotiation for transportation services. The method includes a first step to train the artificial-intelligence based system based on a first set of training data to continuously learn to negotiate with one or more users for the transportation services in real-time. In addition, the method includes a second step for setting consulting perimeter for a cost negotiation model. Further, the method includes a third step to obtain a first set of data from the one or more users requesting for a one or more transport vehicles. Furthermore, the method includes a fourth step to prepare a first cost quotation for the one or more transport vehicles based on analysis of the first set of data and current set of data. Moreover, the method includes a fifth step to send the first cost quotation for the one or more transport vehicles to the one or more users. Also, the method includes a sixth step to receive a response from the one or more users negotiating cost of the first cost quotation for the one or more transport vehicles. In addition, the response from the one or more users is received in real-time. Also, the method includes a seventh step to analyse the response from the one or more users negotiating cost of the first cost quotation for the one or more transport vehicles based on the first set of data and the current set of data. Also, the method includes an eighth step to continuously interacting with the one or more users according to the cost negotiation model for the cost negotiation in real-time. Also, the method includes a ninth step to send a final cost quotation for the one or more transport vehicles to the one or more users in real-time based on continuous interaction with the one or more users. In addition, the training of the artificial-intelligence based system is done to generate the cost negotiation model. Further, the first set of training data is associated with past interactions with the one or more users and the one or more transport vehicles for a plurality of sources and a plurality of destinations. The first set of training data is received from one or more databases. Furthermore, the consulting perimeter for the cost negotiation model is based on threshold limit of negotiation, maximum profit margin, minimum profit margin, number of time to negotiate with the one or more users. Moreover, the first set of data is received from the one or more users with the facilitation of a plurality of communication devices in real-time. Also, the first set of data of the one or more users and current set of data of the one or more users and the one or more vendors is analysed with the facilitation of the cost negotiation model in real-time. Also, the first cost quotation for the one or more transport vehicles is received by the one or more users with the facilitation of the plurality of communication devices in real-time. Also, the final cost quotation for the one or more transport vehicles is received by the one or more users with the facilitation of the plurality of communication devices in real-time.

BRIEF DESCRIPTION OF DRAWINGS

Figure 1:
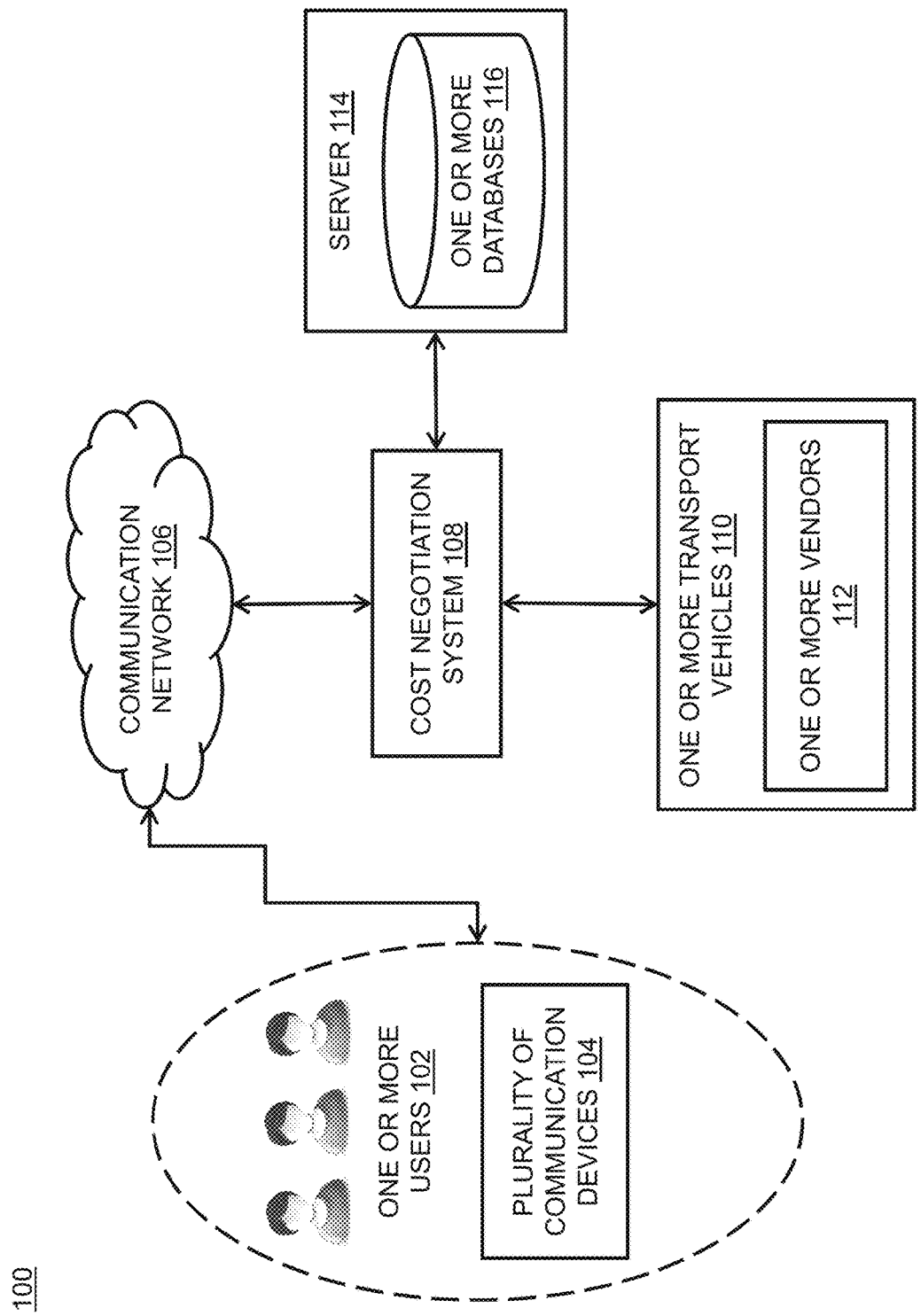
Figure 2:
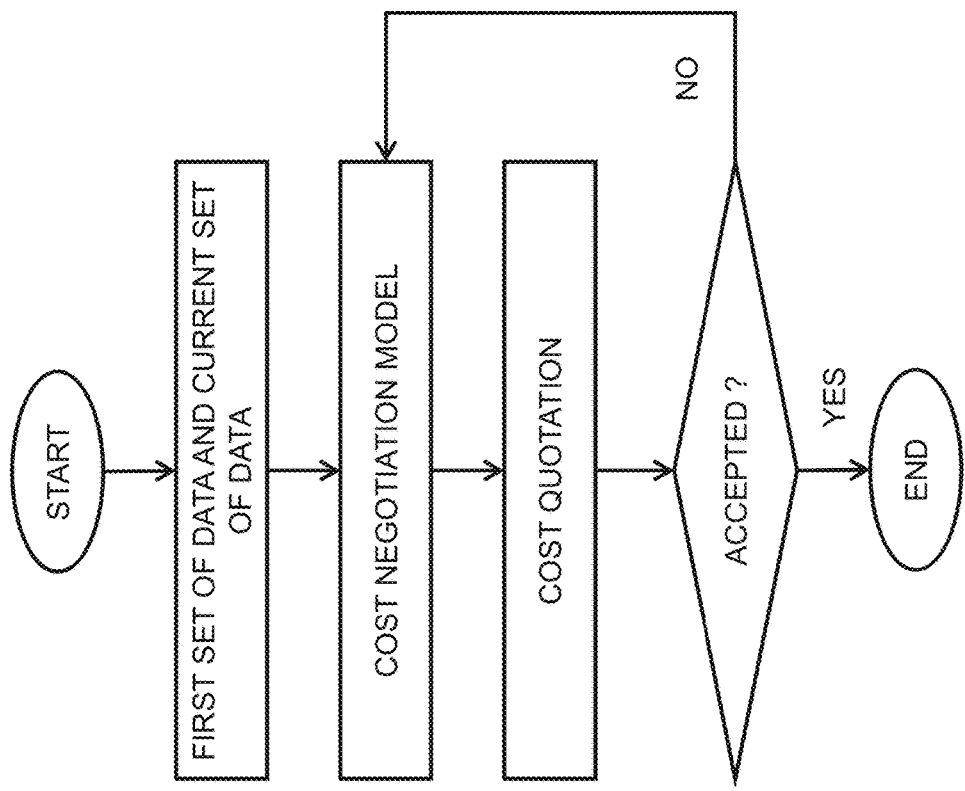
Figure 3A:
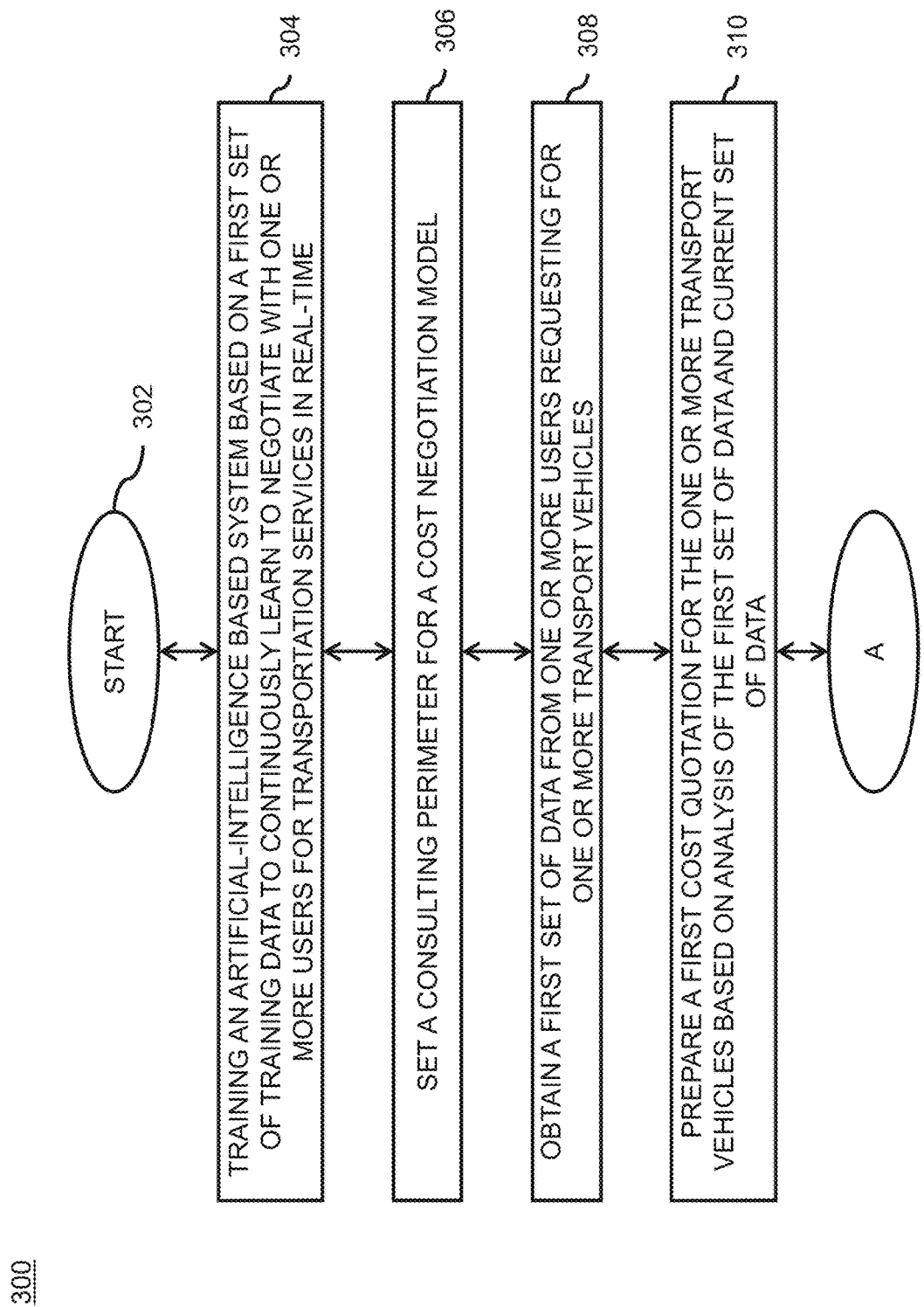
Figure 3B:
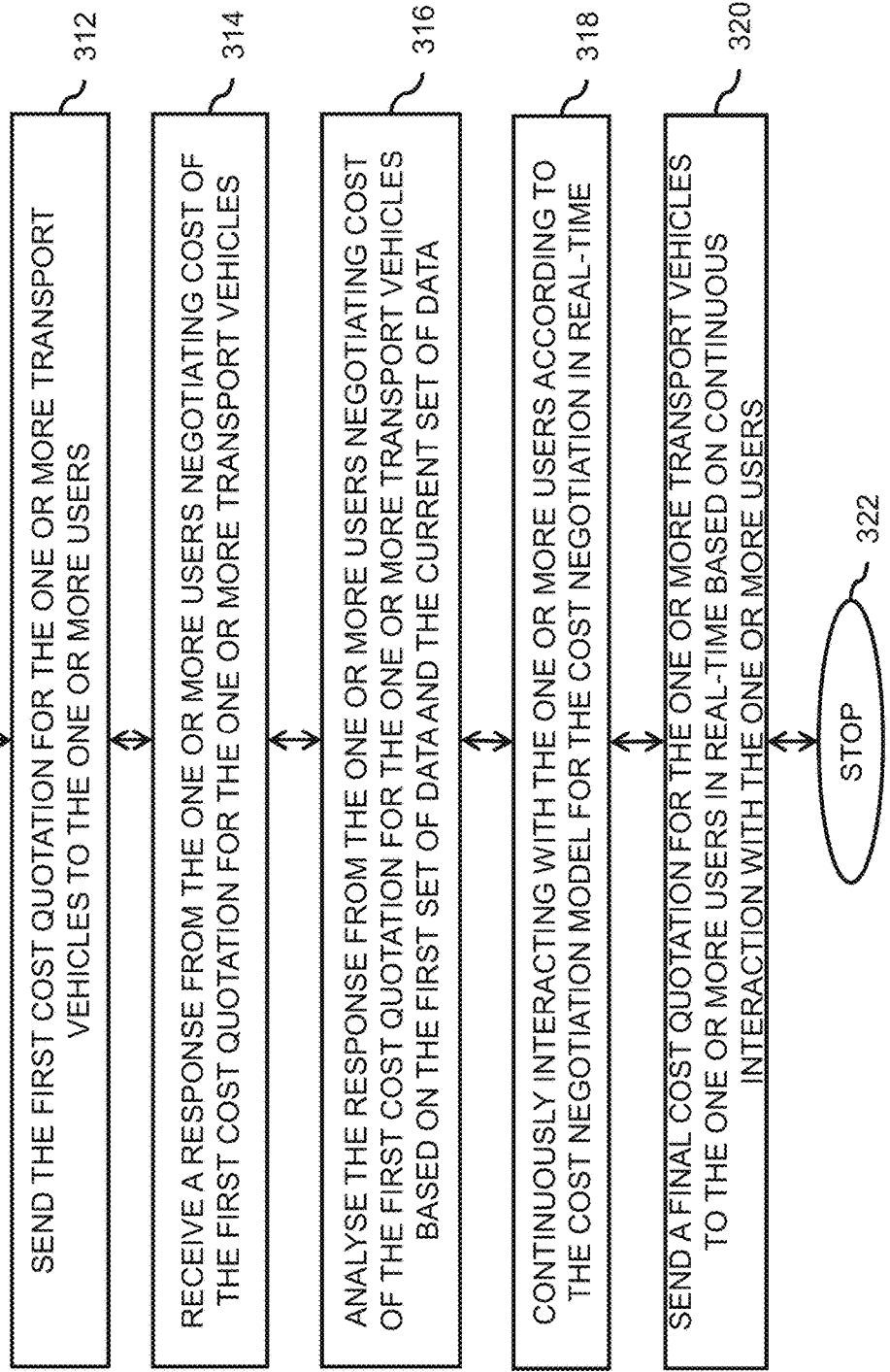
Figure 4:
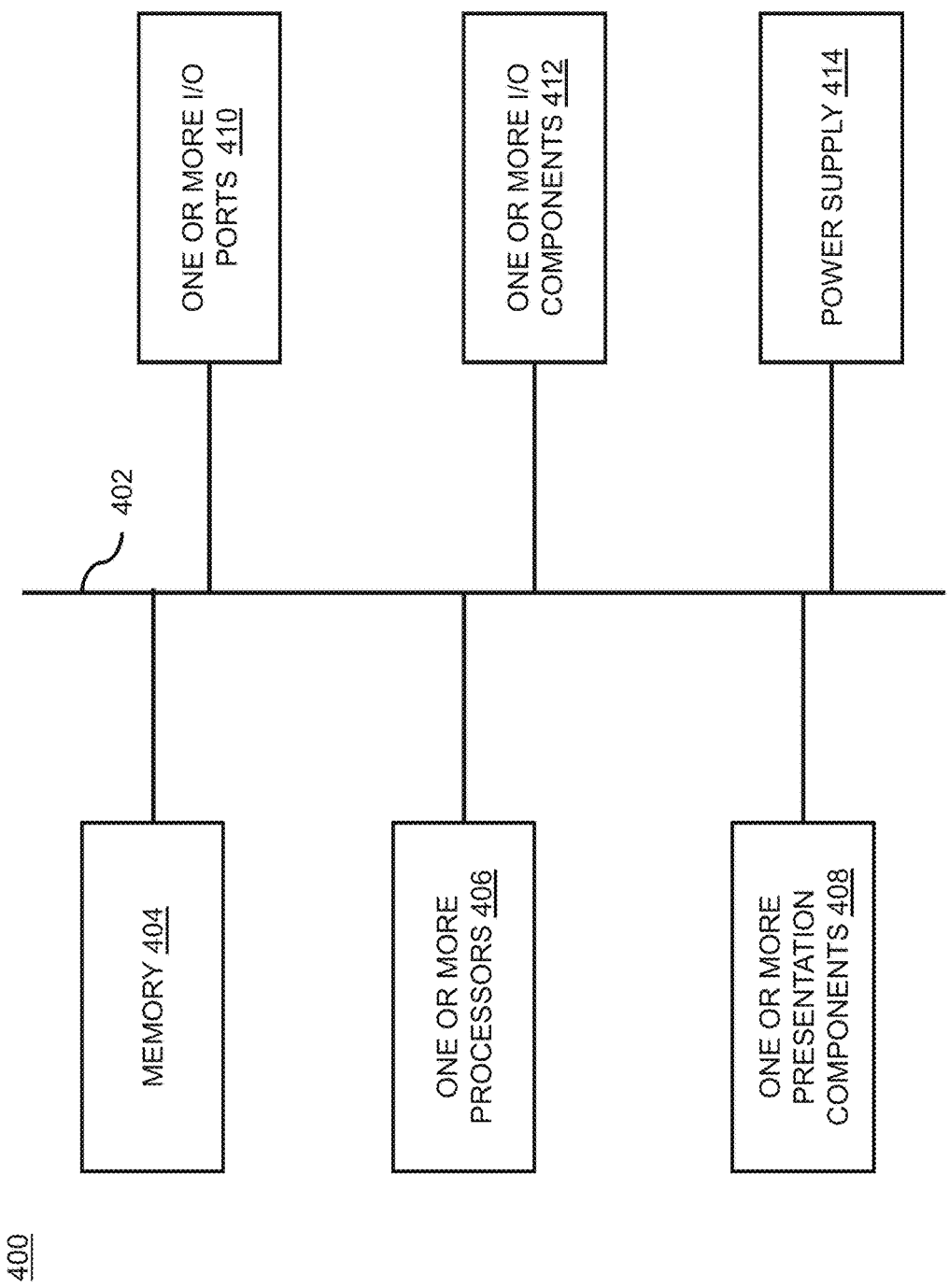

Having thus described the invention in general terms, references will now be made to the accompanying figures, wherein:

FIG. 1 illustrates an interactive computing environment for enabling real-time, dynamic and adaptive artificial-intelligence based cost negotiation for transportation services, in accordance with various embodiments of the present disclosure;

FIG. 2 illustrates a flow chart of flow sequence of the artificial-intelligence based cost negotiation for the transportation services, in accordance with various embodiments of the present disclosure;

FIGS. 3A and 3B illustrate a flow chart of a method for enabling the real-time, dynamic and adaptive artificial-intelligence based cost negotiation for transportation services, in accordance with various embodiments of the present disclosure; and FIG. 4 illustrates a block diagram of a computing device, in accordance with various embodiments of the present disclosure.

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION

In the following description, for purposes of explanation, numerous specific details are set forth in order to provide a thorough understanding of the present technology. It will be apparent, however, to one skilled in the art that the present technology can be practiced without these specific details. In other instances, structures and devices are shown in block diagram form only in order to avoid obscuring the present technology.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

FIG. 1 illustrates an interactive computing environment 100 for real-time, dynamic and adaptive artificial-intelligence based cost negotiation for transportation services, in accordance with various embodiments of the present disclosure. The interactive computing environment 100 shows a relationship between various entities involved in the cost negotiation for the transportation services.

The interactive computing environment 100 includes one or more users 102, a plurality of communication devices 104, a communication network 106, and a cost negotiation system 108. In addition, the interactive computing environment 100 includes one or more transport vehicles 110, one or more vendors 112, a server 114, and one or more databases 116. The above-stated elements of the interactive computing environment 100 operate coherently and synchronously. In an embodiment of the present disclosure, the interactive computing environment 100 is configured to provide a setup for real-time, dynamic and adaptive an artificial-intelligence based cost negotiation for transportation services.

The interactive computing environment 100 is associated with the one or more users 102. In an embodiment of the present disclosure, the one or more users 102 may be any person or an individual looking for cost quotation for transportation of a plurality of products. In another embodiment of the present disclosure, the one or more users 102 may be any person or an individual looking for discount or negotiation on the cost quotation for transportation of the plurality of products. In yet another embodiment of the present disclosure, the one or more users 102 may be any person or an individual looking for transportation assistance. In yet another embodiment of the present disclosure, the one or more users 102 are associated with the plurality of communication devices 104. In another example, the one or more users 102 is an owner of the plurality of communication devices 104. In another example, the one or more users 102 may not be the owner of the plurality of communication devices 104. In another yet embodiment of the present disclosure, the one or more users 102 may be a person who wants assistance of services from the cost negotiation system 108. In yet another embodiment of the present disclosure, the one or more users 102 may be any person. In yet another example, person x wants to transport 4 ton of load with transportation help, the person x can get the cost quotation for transportation of the load based on his/her requirement. In yet another embodiment of the present disclosure, the one or more users 102 may interact with the cost negotiation system 108 directly through the plurality of communication devices 104. In some cases, the one or more users 102 may interact with the cost negotiation system 108 via the plurality of communication devices 104 through the communication network 106.

Further, the communication network 106 denotes to channels of communication (networks by which information flows). Small networks, which are used for connection to the subgroup and are usually contained in a piece of equipment. The local area network, or LAN, cable or fibre is used to connect computer equipment and other terminals distributed in the local area, such as in the college campus. The Metropolitan Area Network or MAN is a high-speed network that is used to connect a small geographical area such as a LAN across the city. Wide area networks, or any communication connections, including WAN, microwave radio link and satellite, are used to connect computers and other terminals to a larger geographic distance.

In an embodiment of the present disclosure, the communication network 106 may be any type of network that provides internet connectivity to the cost negotiation system 108. In another embodiment of the present disclosure, the communication network 106 is a wireless mobile network. In yet another embodiment of the present disclosure, the communication network 106 is a wired network with finite bandwidth. In yet another embodiment of the present disclosure, the communication network 106 is a combination of the wireless and the wired network for optimum throughput of data transmission. In yet another embodiment of the present disclosure, the communication network 106 is an optical fiber high bandwidth network that enables high data rate with negligible connection drops. In yet another embodiment of the present disclosure, the communication network 106 provides a medium for the plurality of communication devices 104 to connect to the cost negotiation system 108. In this scenario, the communication network 106 may be a global network of computing devices such as the Internet. In yet embodiment of the present disclosure, the communication network 106 accesses Internet based on HTTP. In yet embodiment of the present disclosure, the communication network 106 accesses Internet based on HTTPS.

The interactive computing environment 100 includes the plurality of communication devices 104. Commonly, communication devices refer to equipment or device capable of transmitting analog or digital signals through communication wire or remote way. The best case of the communication device is a PC modem, which is equipped for sending and getting analog or digital signals to enable PCs to converse with different PCs. In an embodiment of the present disclosure, the plurality of communication devices 104 includes a computer, laptop, smart television, PDA, electronic tablet, smartphone, wearable devices, tablet, smartwatch, smart display, gesture-controlled devices, and the like. In an example, the plurality of communication devices 104 displays, reads, transmits and gives output to the one or more users 102 in real-time. The one or more users 102 may access the plurality of communication devices 104 while moving from one place to another place. In another example, the place includes home, park, restaurant, any facility, college, office and the like. In addition, the one or more users 102 may access the plurality of communication devices 104 from inside and outside of the environment.

In general, communication devices are used for one or more purposes. In an example, the one or more purposes include communication, entertainment, accessing web-based platforms for different tasks and the like. In an embodiment of the present disclosure, the plurality of communication devices 104 includes a mobile application. The mobile application is installed on the plurality of communication devices 104. In general, the mobile application performs various tasks such as handling notifications and connectivity. Also, the mobile application is programmed in different languages for different platforms. Moreover, the use of the mobile application in online mode and offline mode depends on the type of application used. In an example, the mobile applications are used for entertaining, productivity, marketing and accessing various e-commerce and web-based platforms. In addition, the plurality of communication devices 104 is associated with a camera, a global positioning system, keypad, touchscreen, and the like. The keypad gathers manual data input from the one or more users 102. In another embodiment of the present disclosure, the plurality of communication devices 104 is connected to the cost negotiation system 108 with the facilitation of the communication network 106.

In an embodiment of the present disclosure, the plurality of communication devices 104 is connected to the internet in real-time. Further, the plurality of communication devices 104 is associated with a specific type of operating system. The specific type of operating system includes an Android operating system, a Windows operating system, a mac operating system and the like. Moreover, the plurality of communication devices 104 is connected to the internet through the communication network 106. Further, the plurality of communication devices 104 is connected to the internet through a data connection provided by a telecom service provider. The telecom service provider is associated with a subscriber identification module card located inside the plurality of communication devices 104. Furthermore, the plurality of communication devices 104 may be connected to the internet through a WIFI connection.

In an embodiment of the present disclosure, the plurality of communication devices 104 is associated with the cost negotiation system 108. In addition, the plurality of communication devices 104 is associated with the cost negotiation system 108 through the communication network 106 to gain access to the internet. Moreover, the plurality of communication devices 104 provides a medium for transferring information between the plurality of communication devices 104 and the cost negotiation system 108. Further, the medium for communication may be infrared, microwave, radio frequency (RF) and the like.

The interactive computing environment 100 includes the cost negotiation system 108. The cost negotiation system 108 enables integration between the one or more users 102, the one or more vendors 112, and the one or more transport vehicles 110. In an embodiment of the present disclosure, the cost negotiation system 108 performs one or more steps for the cost quotation for transportation of the plurality of products. Also, the cost negotiation system 108 performs the one or more steps to facilitate the one or more users 102 to negotiate on the cost quotation for transportation of the plurality of products in real-time. In another embodiment of the present disclosure, the cost negotiation system 108 may ask the one or more users 102 to provide one or more details associated with the requirement for the transportation of the plurality of products.

In an embodiment of the present disclosure, the one or more users 102 provide a first set of data. In another embodiment of the present disclosure, the first set of data includes location of source point, time to pick up goods from the source point, location of destination point, time to reach the destination point, overall mass of goods, overall volume of goods, and the like. In yet another embodiment of the present disclosure, the first set of data is received from the one or more users 102. In yet another embodiment of the present disclosure, the first set of data is input on the plurality of communication devices 104. In an example, the first set of data is predicted and prefilled based on the previous interaction of the cost negotiation system 108 and the one or more users 102. In addition, the one or more users 102 can modify the first set of data earlier predicted and prefilled by the cost negotiation system 108 with the facilitation of the plurality of communication devices 104 in real-time.

The interactive computing environment 100 includes the one or more transport vehicles 110. In general, transport vehicles refer to vehicles designed for transport of goods from one place to another. The transport vehicles have variety of payload capacity depending on size and requirement of the vehicles. The transport vehicles for variety of goods have a different arrangement for carrying goods. In an embodiment of the present disclosure, the one or more transport vehicles 110 includes single-axle truck, double-axle truck, tri-axle truck, quad-axle truck, bus, train, aircraft, two-wheeler, three-wheeler, trailer truck, transporter truck and mini-truck, and the like.

The interactive computing environment 100 includes the one or more vendors 112. In general, vendor refers to an enterprise that contributes to goods or services. In addition, the vendor denotes to a supplier of any good or service. In an embodiment of the present disclosure, the one or more vendors 112 transport the plurality of products from one place to another. In another embodiment of the present disclosure, the one or more vendors 112 bid for transportation of the plurality of products from one place to another. In yet another embodiment of the present disclosure, the one or more vendors 112 owns the one or more transport vehicles 110. In yet another embodiment of the present disclosure, the one or more vendors 112 are associated with the cost negotiation system 108 with the facilitation of the communication network 106.

The interactive computing environment 100 includes the server 114. In an embodiment of the present disclosure, the cost negotiation system 108 is associated with the server 114. In another embodiment of the present disclosure, the one or more vendors 112 are associated with the server 114. In yet another embodiment of the present disclosure, the cost negotiation system 108 is installed at the server 114. In yet another embodiment of the present disclosure, the cost negotiation system 108 is installed at a plurality of servers. In general, a server refers to a computer that provides data to other computers. It may serve data to systems on a local area network (LAN) or a wide area network (WAN) over the Internet. Many types of servers exist, including web servers, mail servers, file servers, and the like. Each type of server runs software specific to the purpose of the server. For example, a Web server may run Apache HTTP Server or Microsoft IIS, which both provide access to websites over the Internet. A mail server may run a program like Exim or I Mail, which provides SMTP services for sending and receiving the email. A file server might use Samba or the operating system's built-in file sharing services to share files over a network. While server software is specific to the type of server, the hardware is not as important. In fact, a regular desktop computer can be turned into a server by adding the appropriate software. For example, a computer connected to a home network can be designated as a file server, print server, or both. In another example, the plurality of servers may include a database server, file server, application server and the like. The plurality of servers communicates with each other using the communication network 106. In yet another embodiment of the present disclosure, the cost negotiation system 108 is located in the server 114. In yet another embodiment of the present disclosure, the cost negotiation system 108 is connected with the server 114. In yet another embodiment of the present disclosure, the server 114 is a part of the cost negotiation system 108. In an embodiment of the present disclosure, the server 114 receives data from the one or more databases 116.

The interactive computing environment 100 includes the one or more databases 116. In general, a cloud platform refers to a data structure that stores organized information. Most cloud platforms contain multiple tables, which may each include several different fields. For example, the one or more databases 116 may include records related to previous orders from the one or more users 102, the first set of data, current set of data, performance history of the one or more vendors 112, maintenance history of the one or more transport vehicles 110, and the like. Each of these tables would have different fields that are relevant to the information stored in the table. In another embodiment of the present disclosure, the data available on the one or more web-based platforms is the data filled by the one or more users 102 in past time. In an example, the one or more users 102 updates the data on the one or more web-based platforms on a regular basis. Thus, the cost negotiation system 108 authenticates the first set of data after receiving the first set of data from the one or more users 102 with the facilitation of the plurality of communication devices 104. In yet another embodiment of the present disclosure, the one or more databases 116 includes private databases, third-party databases, paid databases, free databases, training databases, government databases, and the like. In yet another embodiment of the present disclosure, data stored on the one or more databases 116 can be used for the analysis of user behaviour in various scenarios during the cost negotiation, user preferences for various sources and destinations of transportation trip, and the like.

In an embodiment of the present disclosure, the current set of data includes multiple routes pricing, current season, current fuel prices, current laws for transportation, current route health, current range of vehicle, current route, current schedule of the one or more vendors 112, future availability of the one or more transport vehicles 110 on request date, current location of the one or more transport vehicles 110, current estimated time of arrival, current load carrying capacity of vehicle, type of vehicle, length of vehicle, engine capacity of vehicle, vendor score, and the like. Furthermore, the vendor score may be in the form of a bar graph, line graph, pie chart, histogram, and the like. The vendor score is based on the past services offered by the one or more vendors 112, interaction with the one or more vendors 112 and commitment by the one or more vendors 112. Moreover, the vendor score is based on condition of vehicles offered by the one or more vendors 112, cheating history of the one or more vendors 112 and past profitability ratio on hiring the one or more vendors 112. Moreover, the current set of data is fetched from a plurality of databases in real-time. The plurality of databases includes vendor records, Google records, yahoo.com records, government records, one or more state transportation records, weather records, one or more location service providers records and the like. In yet another embodiment of the present disclosure, the plurality of databases includes financial information of the one or more users 102. In yet another embodiment of the present disclosure, the plurality of databases includes performance details of the one or more transport vehicles 110 and the one or more vendors 112.

In addition, the cost negotiation system 108 is based on artificial intelligence. The cost negotiation system 108 is an artificial intelligence based system. The artificial-intelligence based system is trained based on a first set of training data to continuously learn to negotiate with the one or more users 102 for the transportation services. Further, the artificial-intelligence based system is trained in real-time. In an embodiment of the present disclosure, the first set of training data includes past multiple routes pricing, past seasonality-based pricing, past negotiation behaviour of the user, past negotiation pattern, past required transport vehicle size, and the like. Furthermore, the training of the artificial-intelligence based system is done to generate a cost negotiation model. The artificial-intelligence based system incorporates one or more algorithms. The one or more algorithms include but may not be limited to decision tree, random forest, naive bayes classifier, support vector, k-nearest neighbors, and linear regression. Moreover, the first set of training data is associated with past interactions with the one or more users 102 and the one or more transport vehicles 110 for a plurality of sources and a plurality of destinations. Also, the first set of training data is received from the one or more databases 116.

In an embodiment of the present disclosure, the cost negotiation system 108 performs setting of consulting perimeter for the cost negotiation model. The consulting perimeter for the cost negotiation model is based on a threshold limit of negotiation, maximum profit margin and minimum profit margin. In addition, the consulting perimeter for the cost negotiation model is based on number of time to negotiate with the one or more users 102 and absurd negotiation requests from the one or more users 102.

In an embodiment of the present disclosure, the cost negotiation system 108 obtains the first set of data from the one or more users 102 requesting for the one or more transport vehicles 110. The first set of data is received from the one or more users 102 with the facilitation of the plurality of communication devices 104. In addition, the first set of data is received in real-time. Further, the cost negotiation system 108 prepares a first cost quotation on calculations performed by the cost negotiation model based on the first set of data and the current set of data. The first cost quotation includes vehicle details, overall transportation cost, terms of transportation, conditions of transportation, and the like. In another embodiment of the present disclosure, the cost negotiation system 108 performs sending of the first cost quotation for the one or more transport vehicles 110 to the one or more users 102. Furthermore, the first cost quotation for the one or more transport vehicles 110 is received by the one or more users 102 with the facilitation of the plurality of communication devices 104. Moreover, the first cost quotation for the one or more transport vehicles 110 is received by the one or more users 102 in real-time.

In an embodiment of the present disclosure, the cost negotiation system 108 receives a response from the one or more users 102. In another embodiment of the present disclosure, the one or more users 102 agree on the first cost quotation. In yet another embodiment of the present disclosure, the one or more users 102 requests for negotiating on the first cost quotation. In yet another embodiment of the present disclosure, the one or more users 102 do not agree on the final cost quotation. In addition, the response from the one or more users 102 is received in real-time.

In an embodiment of the present disclosure, the cost negotiation system 108 performs analysing of the response from the one or more users 102 for negotiating on the cost of the first cost quotation based on the first set of data and the current set of data. In an embodiment of the present disclosure, the cost negotiation system 108 performs continuous interaction with the one or more users 102 according to the cost negotiation model for the cost negotiation. In addition, the continuous interaction with the one or more users 102 is done in real-time.

In addition, the cost negotiation system 108 sends a final cost quotation for the one or more transport vehicles 110 to the one or more users 102 based on the continuous interaction with the one or more users 102. In addition, the cost negotiation system 108 sends the final cost quotation to the one or more users 102 in real-time. Further, the final cost quotation for the one or more transport vehicles 110 is received by the one or more users 102 with the facilitation of the plurality of communication devices 104. The final cost quotation is received by the one or more users 102 in real-time.

FIG. 2 illustrates a flow chart 200 for flow sequence of the artificial-intelligence based cost negotiation for the transportation services, in accordance with various embodiments of the present disclosure. The flow chart 200 includes a first step of receiving the first set of data and the current set of data. In addition, the flow chart 200 includes a second step of analysing the first set of data and the current set of data with the facilitation of the cost negotiation model. Further, the flow chart 200 includes a third step of preparing the cost quotation. In addition, the cost quotation is sent to the one or more users 102. In an embodiment of the present disclosure, the one or more users 102 may not accept the cost quotation. Further, the cost quotation is sent back to the cost negotiation model and the process further follows the route. In another embodiment of the present disclosure, the one or more users 102 may accept the cost quotation prepared by the cost negotiation model. Furthermore, the flow chart 200 terminates on the acceptance from the one or more users 102. Moreover, the one or more parameters are significant to adopt final route from one or more routes.

It may be noted that the flow chart 200 is explained to have above stated process steps; however, those skilled in the art would appreciate that the flow chart 200 may have more/less number of process steps which may enable all the above-stated embodiments of the present disclosure.

FIGS. 3A and 3B illustrate a flow chart 300 of a method for enabling real-time, dynamic and adaptive the artificial-intelligence based cost negotiation for the transportation services, in accordance with various embodiments of the present disclosure. It may be noted that to explain the process steps of flowchart 300, references will be made to the system elements of FIG. 1. It may also be noted that the flowchart 300 may have lesser or more number of steps.

The flow chart 300 initiates at step 302. Following step 302, at step 304, the cost negotiation system 108 enables training of the artificial-intelligence based system based on the first set of training data to continuously learn to negotiate with the one or more users 102 for the transportation services in real-time. Following step 304, at step 306, the cost negotiation system 108 sets the consulting perimeter for the cost negotiation model. Following step 306, at step 308, the cost negotiation system 108 obtains the first set of data from the one or more users 102 requesting for the one or more transport vehicles 110. Following step 308, at step 310, the cost negotiation system 108 prepares the first cost quotation for the one or more transport vehicles 110 based on the analysis of the first set of data and the current set of data. Following step 310, at step 312, the cost negotiation system 108 sends the first cost quotation for the one or more transport vehicles 110 to the one or more users 102. Following step 312, at step 314, the cost negotiation system 108 receives the response from the one or more users 102 negotiating cost of the first cost quotation for the one or more transport vehicles 110. In addition, the response from the one or more users 102 is received in real-time. Following step 314, at step 316, the cost negotiation system 108 analyses the response from the one or more users 102 negotiating cost of the first cost quotation for the one or more transport vehicles 110 based on the first set of data and the current set of data. Following step 316, at step 318, the cost negotiation system 108 enables continuous interaction with the one or more users according to the cost negotiation model for the cost negotiation in real-time. Following step 318, at step 320, the cost negotiation system 108 sends the final cost quotation for the one or more transport vehicles 110 to the one or more users 102 in real-time based on the continuous interaction with the one or more users 102.

The flow chart 300 terminates at step 318. It may be noted that the flowchart 300 is explained to have above stated process steps; however, those skilled in the art would appreciate that the flowchart 300 may have more/less number of process steps which may enable all the above stated embodiments of the present disclosure.

FIG. 4 illustrates a block diagram of a computing device 400, in accordance with various embodiments of the present disclosure. In an embodiment of the present disclosure, the computing device 400 illustrates hardware elements of each communication device of the communication devices 104. The computing device 400 is a non-transitory computer readable storage medium. The computing device 400 includes a bus 402 that directly or indirectly couples the following devices: memory 404, one or more processors 406, one or more presentation components 408, one or more input/output (I/O) ports 410, one or more input/output components 412, and an illustrative power supply 414. The bus 402 represents what may be one or more busses (such as an address bus, data bus, or combination thereof). Although the various blocks of FIG. 4 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 4 is merely illustrative of an exemplary computing device 400 that can be used in connection with one or more embodiments of the present invention. Distinction is not made between such categories as "workstation," "server," "laptop," "hand-held device," etc., as all are contemplated within the scope of FIG. 4 and reference to "computing device."

The computing device 400 typically includes a variety of computer-readable media. The computer-readable media can be any available media that can be accessed by the computing device 400 and includes both volatile and nonvolatile media, removable and non-removable media. By way of example, and not limitation, the computer-readable media may comprise computer storage media and communication media. The computer storage media includes volatile and nonvolatile, removable and non-removable media implemented in any system or technology for storage of information such as computer-readable instructions, data structures, program modules or other data. The computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 400. The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 404 includes computer-storage media in the form of volatile and/or nonvolatile memory. The memory 404 may be removable, non-removable, or a combination thereof. Exemplary hardware devices include solid-state memory, hard drives, optical-disc drives, etc. The computing device 400 includes one or more processors that read data from various entities such as memory 404 or I/O components 412. The one or more presentation components 408 present data indications to a user or other device. Exemplary presentation components include a display device, speaker, printing component, vibrating component, etc. The one or more I/O ports 410 allow the computing device 400 to be logically coupled to other devices including the one or more I/O components 412, some of which may be built in. Illustrative components include a microphone, joystick, game pad, satellite dish, scanner, printer, wireless device and the like.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the invention have been described above and illustrated in some cases, it should be interpreted and understood as to have been presented only by way of illustration and example, but not by limitation. Thus, the breadth and scope of a preferred embodiment should not be limited by any of the above-described exemplary embodiments.

What is claimed is:

1. A computer-implemented method for enabling real-time, dynamic and adaptive artificial-intelligence based cost negotiation for transportation services, the computer-implemented method comprising:

training, at a cost negotiation system with a processor, an artificial-intelligence based system based on a first set of training data to continuously learn to negotiate with one or more users for the transportation services in real-time, wherein the training of the artificial-intelligence based system is done for generating a cost negotiation model, wherein the first set of training data is associated with past interactions with the one or more users and one or more transport vehicles for a plurality of sources and a plurality of destinations, wherein the first set of training data is received from one or more databases;

setting, at the cost negotiation system with the processor, consulting perimeter for the cost negotiation model, wherein the consulting perimeter for the cost negotiation model is based on threshold limit of negotiation, maximum profit margin, minimum profit margin, number of times to negotiate with the one or more users;

obtaining, at the cost negotiation system with the processor, a first set of data from the one or more users requesting for the one or more transport vehicles, wherein the first set of data is received from the one or more users with facilitation of a plurality of communication devices in real-time;

preparing, at the cost negotiation system with the processor, a first cost quotation for the one or more transport vehicles based on analysis of the first set of data of the one or more users and current set of data of the one or more users and the one or more vendors, wherein the first set of data of the one or more users and current set of data of the one or more users and the one or more vendors is analyzed with facilitation of the cost negotiation model in real-time;

sending, at the cost negotiation system with the processor, the first cost quotation for the one or more transport vehicles to the one or more users, wherein the first cost quotation for the one or more transport vehicles is received by the one or more users with facilitation of the plurality of communication devices in real-time;

receiving, at the cost negotiation system with the processor, a response from the one or more users negotiating for cost of the first cost quotation for the one or more transport vehicles, wherein the response from the one or more users is received in real-time;

analyzing, at the cost negotiation system with the processor, the response from the one or more users negotiating cost of the first cost quotation for the one or more transport vehicles based on the first set of data and the current set of data of the one or more users;

interacting, at the cost negotiation system with the processor, continuously with the one or more users according to the cost negotiation model for the cost negotiation in real-time; and sending, at the cost negotiation system with the processor, a final cost quotation for the one or more transport vehicles to the one or more users in real-time based on continuous interaction with the one or more users, wherein the final cost quotation for the one or more transport vehicles is received by the one or more users with facilitation of the plurality of communication devices in real-time.

2. The computer-implemented method as recited in claim 1, wherein the first set of training data comprising past multiple routes pricing, past seasonality-based pricing, past negotiation behaviour of the user, past negotiation pattern and past required transport vehicle size.

3. The computer-implemented method as recited in claim 1, wherein the first set of data comprising location of source point, time to pick up goods from the source point, location of destination point, time to reach the destination point, overall mass of goods and overall volume of goods.

4. The computer-implemented method as recited in claim 1, wherein the current set of data comprising multiple routes pricing, current season, current fuel prices, current laws for transportation, current route health, current range of vehicle, current route, current schedule of the one or more vendors, future availability of the one or more transport vehicles on request date, current location of the one or more transport vehicles, current estimated time of arrival, current load carrying capacity of vehicle, type of vehicle, length of vehicle, engine capacity of vehicle and vendors score.

5. The computer-implemented method as recited in claim 1, wherein the first cost quotation comprising vehicle details, overall transportation cost, terms of transportation and conditions of transportation.

6. The computer-implemented method as recited in claim 1, wherein the one or more databases comprising private databases, third-party databases, paid databases, free databases, training databases and government databases.

7. The computer-implemented method as recited in claim 1, wherein the one or more users agree on the first cost quotation, wherein the cost negotiation system facilitates the transportation services to the one or more users.

8. The computer-implemented method as recited in claim 1, wherein the one or more users request for negotiating on the first cost quotation, wherein the cost negotiation system facilitates the transportation services to the one or more users after the negotiation.

9. A computer system comprising:
one or more processors; and
a memory coupled to the one or more processors, the memory for storing instructions which, when executed by the one or more processors, cause the one or more processors to perform a method for enabling real-time, dynamic and adaptive artificial-intelligence based cost negotiation for transportation services, the method comprising:

training, at a cost negotiation system, an artificial-intelligence based system based on a first set of training data to continuously learn to negotiate with one or more users for the transportation services in real-time, wherein the training of the artificial-intelligence based system is done for generating a cost negotiation model, wherein the first set of training data is associated with past interactions with the one or more users and one or more transport vehicles for a plurality of sources and a plurality of destinations, wherein the first set of training data is received from one or more databases;

setting, at the cost negotiation system, consulting perimeter for the cost negotiation model, wherein the consulting perimeter for the cost negotiation model is based on threshold limit of negotiation, maximum profit margin, minimum profit margin, number of times to negotiate with the one or more users;

obtaining, at the cost negotiation system, a first set of data from the one or more users requesting for the one or more transport vehicles, wherein the first set of data is received from the one or more users with facilitation of a plurality of communication devices in real-time;

preparing, at the cost negotiation system, a first cost quotation for the one or more transport vehicles based on analysis of the first set of data of the one or more users and current set of data of the one or more users and the one or more vendors, wherein the first set of data of the one or more users and current set of data of the one or more users and the one or more vendors is analyzed with facilitation of the cost negotiation model in real-time;

sending, at the cost negotiation system, the first cost quotation for the one or more transport vehicles to the one or more users, wherein the first cost quotation for the one or more transport vehicles is received by the one or more users with facilitation of the plurality of communication devices in real-time;

receiving, at the cost negotiation system, a response from the one or more users negotiating for cost of the first cost quotation for the one or more transport vehicles, wherein the response from the one or more users is received in real-time;

analyzing, at the cost negotiation system, the response from the one or more users negotiating cost of the first cost quotation for the one or more transport vehicles based on the first set of data and the current set of data of the one or more users;

interacting, at the cost negotiation system, continuously with the one or more users according to the cost negotiation model for the cost negotiation in real-time; and sending, at the cost negotiation system, a final cost quotation for the one or more transport vehicles to the one or more users in real-time based on continuous interaction with the one or more users, wherein the final cost quotation for the one or more transport vehicles is received by the one or more users with facilitation of the plurality of communication devices in real-time.

10. The computer system as recited in claim 9, wherein the first set of training data comprising past multiple routes pricing, past seasonality-based pricing, past negotiation behaviour of the user, past negotiation pattern and past required transport vehicle size.

11. The computer system as recited in claim 9, wherein the first set of data comprising location of source point, time to pick up goods from the source point, location of destination point, time to reach the destination point, overall mass of goods and overall volume of goods.

12. The computer system as recited in claim 9, wherein the current set of data comprising multiple routes pricing, current season, current fuel prices, current laws for transportation, current route health, current range of vehicle, current route, current schedule of the one or more vendors, future availability of the one or more transport vehicles on request date, current location of the one or more transport vehicles, current estimated time of arrival, current load carrying capacity of vehicle, type of vehicle, length of vehicle, engine capacity of vehicle and vendors score.

13. The computer system as recited in claim 9, wherein the first cost quotation comprising vehicle details, overall transportation cost, terms of transportation and conditions of transportation.

14. The computer system as recited in claim 9, wherein the one or more databases comprising private databases, third-party databases, paid databases, free databases, training databases and government databases.

15. The computer system as recited in claim 9, wherein the one or more users agree on the first cost quotation, wherein the cost negotiation system facilitates the transportation services to the one or more users.

16. The computer system as recited in claim 9, wherein the one or more users request for negotiating on the first cost quotation, wherein the cost negotiation system facilitates the transportation services to the one or more users after the negotiation.

17. A non-transitory computer-readable storage medium encoding computer executable instructions that, when executed by at least one processor, performs a method for enabling real-time, dynamic and adaptive artificial-intelligence based cost negotiation for transportation services, the method comprising:
   training, at a computing device, an artificial-intelligence based system based on a first set of training data to continuously learn to negotiate with one or more users for the transportation services in real-time, wherein the training of the artificial-intelligence based system is done for generating a cost negotiation model, wherein the first set of training data is associated with past interactions with the one or more users and one or more transport vehicles for a plurality of sources and a plurality of destinations, wherein the first set of training data is received from one or more databases;
   setting, at the computing device, consulting perimeter for the cost negotiation model, wherein the consulting perimeter for the cost negotiation model is based on threshold limit of negotiation, maximum profit margin, minimum profit margin, number of times to negotiate with the one or more users;
   obtaining, at the computing device, a first set of data from the one or more users requesting for the one or more transport vehicles, wherein the first set of data is received from the one or more users with facilitation of a plurality of communication devices in real-time;
   preparing, at the computing device, a first cost quotation for the one or more transport vehicles based on analysis of the first set of data of the one or more users and current set of data of the one or more users and the one or more vendors, wherein the first set of data of the one or more users and current set of data of the one or more users and the one or more vendors is analyzed with facilitation of the cost negotiation model in real-time;
   sending, at the computing device, the first cost quotation for the one or more transport vehicles to the one or more users, wherein the first cost quotation for the one or more transport vehicles is received by the one or more users with facilitation of the plurality of communication devices in real-time;
   receiving, at the computing device, a response from the one or more users negotiating for cost of the first cost quotation for the one or more transport vehicles, wherein the response from the one or more users is received in real-time;
   analyzing, at the computing device, the response from the one or more users negotiating cost of the first cost quotation for the one or more transport vehicles based on the first set of data and the current set of data of the one or more users;
   interacting, at the computing device, continuously with the one or more users according to the cost negotiation model for the cost negotiation in real-time; and
   sending, at the computing device, a final cost quotation for the one or more transport vehicles to the one or more users in real-time based on continuous interaction with the one or more users, wherein the final cost quotation for the one or more transport vehicles is received by the one or more users with facilitation of the plurality of communication devices in real-time.

18. The non-transitory computer-readable storage medium as recited in claim 17, wherein the first set of training data comprising past multiple routes pricing, past seasonality-based pricing, past negotiation behavior of the user, past negotiation pattern and past required transport vehicle size.

19. The non-transitory computer-readable storage medium as recited in claim 17, wherein the first set of data comprising location of source point, time to pick up goods from the source point, location of destination point, time to reach the destination point, overall mass of goods and overall volume of goods.

20. The non-transitory computer-readable storage medium as recited in claim 17, wherein the current set of data comprising multiple routes pricing, current season, current fuel prices, current laws for transportation, current route health, current range of vehicle, current route, current schedule of the one or more vendors, future availability of the one or more transport vehicles on request date, current location of the one or more transport vehicles, current estimated time of arrival, current load carrying capacity of vehicle, type of vehicle, length of vehicle, engine capacity of vehicle and vendors score.

* * * * *